Jan. 19, 1937.  E. B. WILFORD  2,068,618
SEA GYROPLANE
Filed March 19, 1935   2 Sheets-Sheet 1
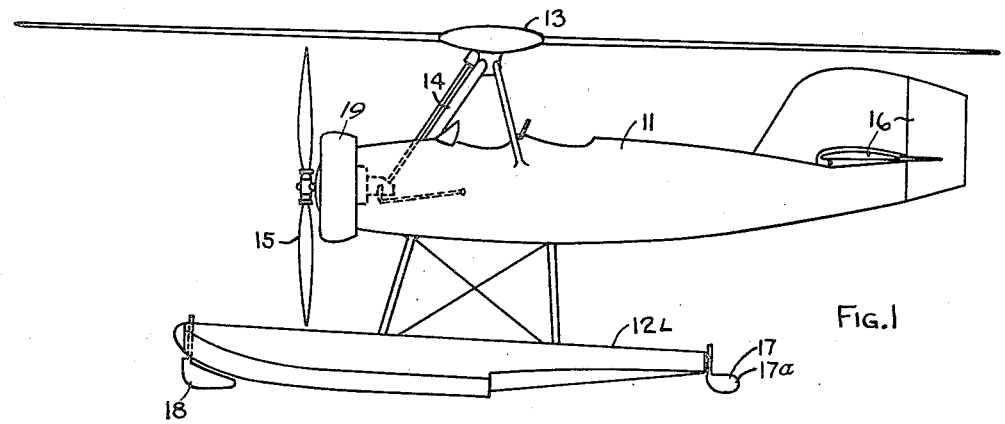
FIG. 1
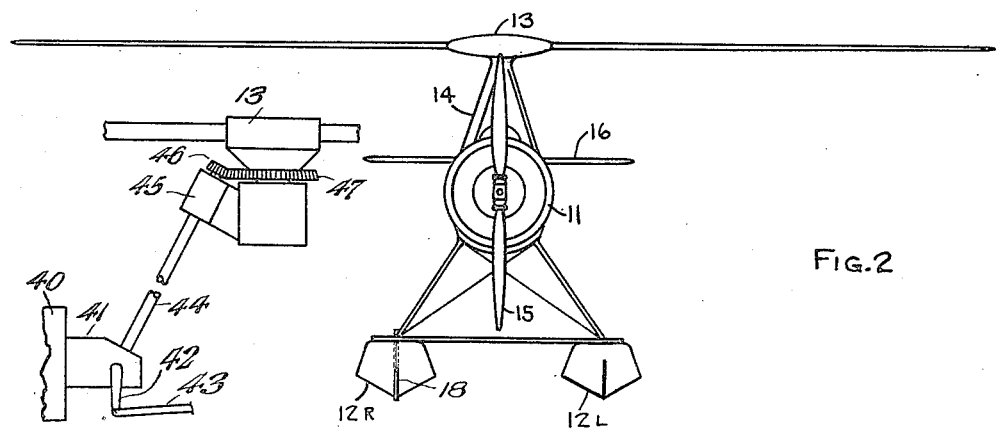
FIG. 2
FIG. 10.
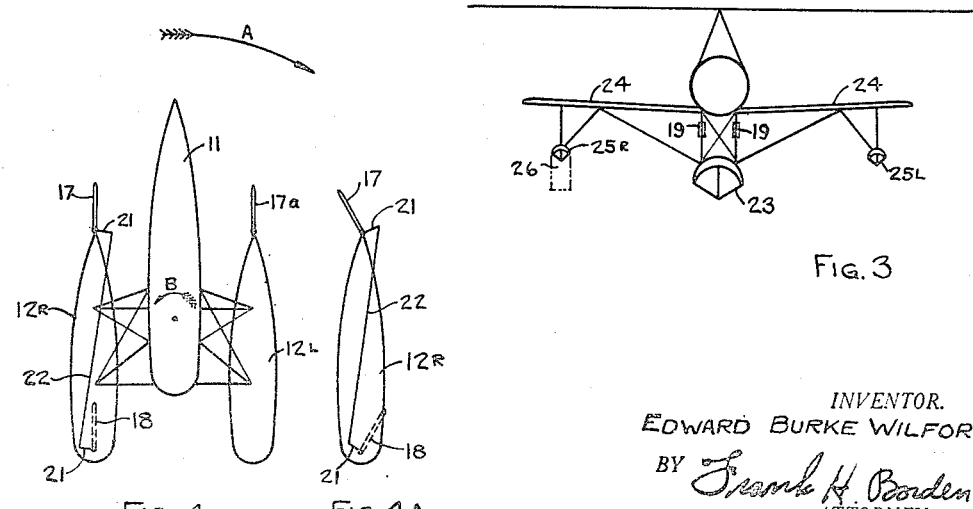
FIG. 3
FIG. 4   FIG. 4A
INVENTOR.
EDWARD BURKE WILFORD
BY Frank H. Borden
ATTORNEY Jan. 19, 1937.  E. B. WILFORD  2,068,618
SEA GYROPLANE
Filed March 19, 1935  2 Sheets-Sheet 2

INVENTOR.
EDWARD BURKE WILFORD
BY Frank H. Borden
ATTORNEY

Patented Jan. 19, 1937

2,068,618

UNITED STATES PATENT OFFICE 2,068,618

SEA GYROPLANE

Edward Burke Wilford, Merion, Pa.

Application March 19, 1935, Serial No. 11,751

5 Claims. (Cl. 244—18)

REISSUED
DEC 19 1939

The invention relates to various types of watercraft which are customary to the normal aeroplane, but in which the lifting elements have been replaced by a gyro rotor or a combination of a gyro rotor and a fixed wing.

The principal object of this invention is to provide in this field of aviation a gyro which can successfully fly or take off from the water, but the invention is not limited to the particular feature shown, but is to be broadly interpreted to cover any type of gyro which incorporates the additions or combinations herein set forth.

It is well known that gyros land at a comparatively slow speed and take off at a speed much lower than that of the present aeroplane. It is therefore very advantageous, if the unique problems which face this off-the-water flying can be solved as later pointed out, to have such a combined craft, and the description herein discloses how the problems incident to the use of gyro rotors on sea-planes or flying boats can be overcome.

The invention also contemplates a useful amphibian type of gyro.

In the accompanying drawings:

Fig. 1 is a side view of an aircraft according to this invention using twin floats and a rotary wing system but no fixed wing, Fig. 2 is a front view of the aircraft shown in Fig. 1, Fig. 3 is a front view of an airplane having a rotary wing system using a single float and a wing with tip floats, Fig. 4 is a diagrammatic top view of a twin float aircraft showing rudders in normal position, Fig. 4a is a fragmentary plan of one float of the aircraft of Fig. 4, with rudders in position for starting the rotor, Fig. 5 is a side view of a flying boat type of rotary wing aircraft.

Fig. 10 is a fragmentary view of the rotor starting system.

Figure 5:
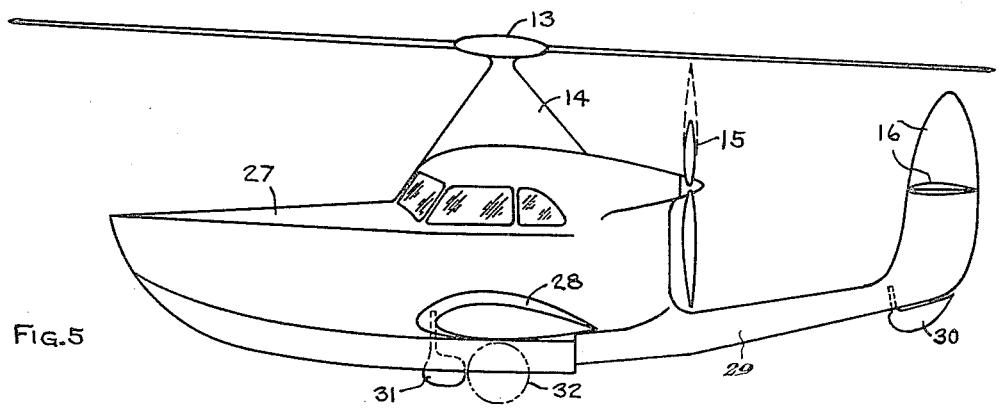

In the past gyroplanes have been used entirely from landing fields although conventional airplanes have been flown off the water and landed on it, but the useful combination of a gyroplane, or rotating wing aircraft, and floats or a boat or any means for landing and taking off from water, so far as known, has not heretofore been successful, because, among other reasons, of the difficulty of starting the rotor and of speeding it up to proper rotational speeds. So far as known there are but two alternative procedures to follow to secure such rotor starting and rotating: (a) the airplane must be taxied at a high angle of incidence for a long enough time to get up the necessary rotor speed, or, (b) a mechanical starter must be used which spins the rotor by means of the engine or some other source of energy.

The first method (a) cannot successfully be accomplished because of two inherent characteristics of the floats previously used. First, they require a large amount of power to maintain the lower speeds; i. e., the speeds below that which is required to run on the step and it is in this lower speed range that the starting of the rotor has to be done. Second, the floats previously used are so stiff longitudially at low speeds that it is difficult to rock the ship to an attitude which gives the rotor sufficient angle of incidence so that it can autorotate readily. The second method (b) has been impractical in the past because the torque required to spin the rotor would rotate the whole craft in the opposite direction.

To obviate these difficulties and to make a craft of useful and efficient performance, a different type of float is proposed which, superficially only, appears in the drawings to look like an ordinary float used in seaplanes, and to incorporate rudders and the like capable of generating counteracting torque, both through "lift" transverse of the rudder, and also through drag effective laterally of the lognitudinal axis, about the vertical axis.

Referring to Fig. 1, 11 represents the body of an aircraft using one form of this invention. 12L represents the side view of one of the twin floats. The rotor is mounted on the pylon 14. The propeller 15 for forward motion is driven by an engine 19. The tail surfaces for balance and control are shown at 16. A rear rudder 17 is mounted on one of the floats, in this particular case, the right hand one, and which is lateral of the longitudinal axis of the aircraft. A front rudder 18 is also provided, illustratively mounted also on the right hand float only. Rudder 18 is obviously also disposed laterally of the longitudinal axis of the aircraft.

Fig. 10 shows a conventional rotor starter system in which 40 represents the motor or prime mover which may or may not be the same as motor 19, Fig. 1. A clutch 41 is controlled by clutch control lever 42 through a clutch control rod 43 going to the cockpit. The shaft 44 carries the power to the rotor through a free wheeling unit or ratchet device 45 for taking torque in only one direction. A pinion 46 driven by shaft 44 is in mesh with a gear 47 attached to rotor 13 which is driven from the power plant 40 during starting when clutch is engaged, as will be obvious.

The floats 12R and 12L, although looking like standard seaplane floats, are specially designed to require low power to drive them at speeds of twenty to thirty miles per hour either by a low step loading, if a step is used, or by an efficient or low resistance or easily driven displacement hull, supporting its load by buoyancy, in counterdistinction to a step, which derives support from impact.

If a step is used, it is preferable that the step be located within an angle of 15° of a vertical line passing through the center of gravity, from the center of gravity, or within 15° of the axis of rotation measured from the center of the rotor.

While most seaplanes require speeds of fifty to sixty miles per hour to take off, the gyroplane only requires from thirty to forty miles per hour, and this necessitates a major change in the proportions and shape of the floats. Furthermore, according to this invention the longitudinal stiffness is diminished and the center of gravity of the aircraft so placed with regard to the center of buoyancy of the floats that it is easy for the pilot to increase the angle of incidence of the rotor by use of his elevators or rotor control, or both, even at these low velocities.

Fig. 2 is a front view of the plane shown is Fig. 1 and merely makes clearer the principal parts of the craft.

Fig. 4, a top view of the craft shown in Fig. 1, shows the location of the rudder 17 at the rear of the right hand float 12R with rudder 18 at the nose of the right hand float 12R, and with a supplemental rear rudder 17a at the rear of the left hand float 12L. The arrow A indicates the direction of rotation of the supporting rotor, clockwise, and arrow B indicates the counter-clockwise direction of the counter-torque, or direction the craft tries to turn when the starter is in use.

Fig. 4a shows the position of the rudders 17 and 18 when the rotor is being started. This is accomplished by arms 21 which are fixed to the rudders and operating link 22 which, when actuated, controls the positions of the front and rear rudders, and during starting actuates the rudders so that rudder 17 is to the right and rudder 18 is to the left as shown.

Preferably, when the starter is used, the propeller 15 is turning and producing thrust which pulls the plane ahead in the water. This forward motion, when rudders are set as in Fig. 4a produces (1) a lateral clockwise couple composed of a force acting to the right at the rear and an equal force acting to the left at the front of the right hand float, and (2) a longitudinal clockwise couple consisting of the drag force of both rudders 17 and 18 acting backward on the right and the pull of the propeller acting forward at the center.

The addition of these two couples, which act in the same direction, i. e., clockwise, produces an effect powerful enough to prevent the aircraft from turning in a circle when the starter is in use. The rudder 17a may be used when directional steering is required.

Figs. 1 and 2 show a gyroplane with no wing. It is not intended to limit this type to a wingless gyro as, obviously, a wing may be used if required. Fig. 3 shows a gyroplane with a single float 23 and a wing 24 on which are mounted wing tip floats 25R and 25L. In this form of the invention the required couple for resistance to starting torque is obtained by a fore and aft pair of rudders on the float 23 which are operated in exactly the same manner as those shown in Fig. 4a, and also by a water brake plate 26, which is mounted on the right hand wing float 25R, and the drag from this plate produces the necessary clockwise couple. The plate 26 is preferably hinged to the rear of the float and the free end of the plate is lowered and raised by a cable or suitable linkage.

In Fig. 5 the invention is shown as applied to a flying boat. The hull 27 has a slim after portion 29 which can easily be submerged by use of the high elevator (part of 16) thus securing the necessary angle of incidence.

Figure 6:
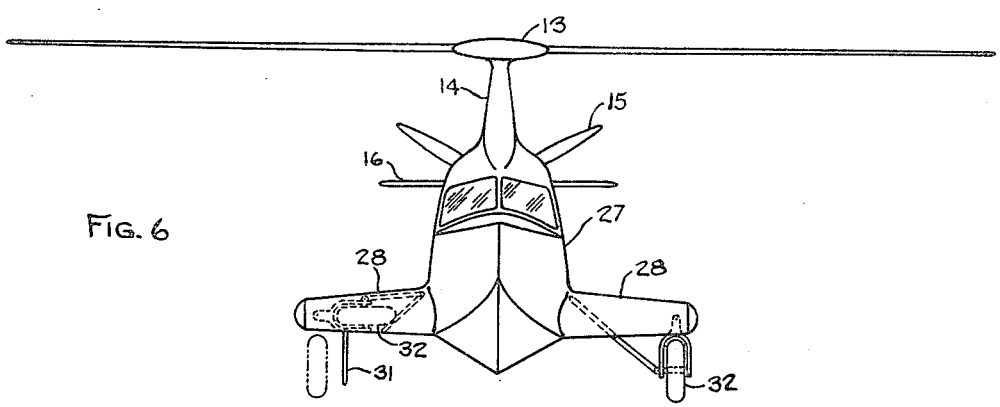
Fig. 6 is a front view of aircraft shown in Fig. 5.

The front view disclosed in Fig. 6 shows the boat equipped with sponsons or stubs 28 which are merely one of the common ways of securing lateral stability on the water. They may be replaced by a wing and tip floats if desired, as in Fig. 3. The hull 27 is equipped with water rudder 30 and in addition the right hand sponson or stub 28 carries another rudder 31. When starting the rotor these rudders are turned as shown in Fig. 4a, the rear one to the right and the front one to the left. This, as in the case of Fig. 4, makes two couples act in the same direction, both opposing the starting torque, one a lateral one due to front and rear rudders and the other a longitudinal couple due to drag of 31 on the right side.

This aircraft, if desired, although it is not essential, may also be equipped with landing gear and wheels 32 which can be retracted when the craft is used on water in a manner shown in the drawings of 32 on the right hand or starboard side (left on sheet). The wheels when in use will both be lowered as shown on the left or port side and the aircraft can then be landed on land.

Figure 7:
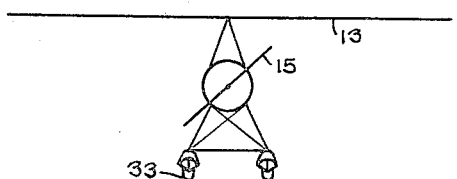
Fig. 7 is a diagrammatic front view of a rotary wing aircraft which can land on either land or water with twin floats.
Figure 8:
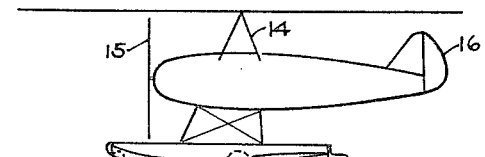
Fig. 8 is a diagrammatic side view of the aircraft shown in Fig. 7.

Figs. 7 and 8 show front and side views of a similar seaplane to that shown in Figs. 1 and 2 with the exception that wheels 33 are shown mounted in the floats. This form of craft is a most useful one for landing on both land and water.

Figure 9:
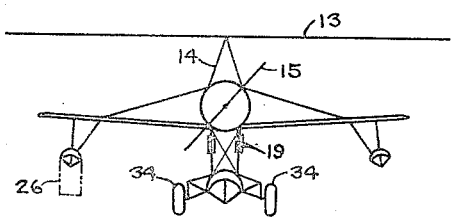
Fig. 9 is a diagrammatic front view of a rotary wing aircraft that can land on both land and water with a single float.

Fig. 9 shows the aircraft similar to that shown and described in connection with Fig. 3, but with the addition of the landing gear and wheels 34 which can be raised up out of the water when the craft is being used in water, and can be lowered at the will of the pilot when he desires to land on a field.

To facilitate the easing of the shock of the substantially vertical landings of this type of craft, shock absorbers 19 may be suitably disposed, as shown for instance in Figs. 3 and 9.

In landing a rotary wing aircraft at its slowest speed a very high angle of attack is necessary, and in some cases a vertical velocity of a considerable amount has to be stopped in the landing. For this purpose the floats herein described are particularly useful since; (1) the concentration of the bouyancy allows the high incidence position without dragging the tail and without a tendency to pitch at the last, (2) the steep V bottom cushions the shock and stops the high vertical velocities with the least load in the structure, and (3) the struts equipped with shock absorbing devices, as 19 in Figs. 3 and 9, by collapsing under load, absorbs the shock of landing and reduces the loads in the structure.

These different forms and others, if they are equipped to adapt a rotary wing aircraft to use on water by means for opposing starting torque by a longitudinal couple consisting of a drag force effective laterally of the longitudinal axis of the craft and by pull of the propeller effective on said longitudinal axis, and/or by the lateral couple composed of forces acting at the front and rear effectively laterally of the longitudinal axis, and/or means for increasing the angle of attack in starting on water, come under the intent of this description.

I claim:

1. In aircraft, a body having a longitudinal axis, propeller means, water contact supporting means operatively mounted on the body, a normally aerodynamically driven rotary wing system operatively associated with the body and having a substantially vertical axis of rotation passing substantially through said longitudinal axis, rotor starting means, fore and after rudders disposed respectively in front and rear of said vertical axis and effective laterally of the longitudinal axis to develop a torque reaction about said vertical axis through contact with the water, said reacting means comprised of elements effective both in front and rear of said vertical axis to develop a reacting couple about said vertical axis to develop appreciable torque at a low speed and substantially without lateral displacement.

2. In aircraft, a body having a longitudinal axis, propeller means, water contact supporting means operatively mounted on the body, a normally aerodynamically driven rotary wing system operatively associated with the body and having a substantially vertical axis of rotation passing substantially through said longitudinal axis, rotor starting means, means comprising fore and aft rudders effective laterally of the longitudinal axis to develop a torque reaction about said vertical axis through contact with the water, said reacting means disposed laterally of the longitudinal axis and comprising means to generate with the propeller means a longitudinal torque reacting couple through drag in the water, as well as a lateral couple composed of opposite forces on opposite sides of said substantially vertical axis.

3. In rotary wing aircraft, a body having a longitudinal plane of symmetry, propeller means, water contact supporting means operatively mounted on the body symmetrically of the plane of symmetry, a rotary wing system operatively associated with the body and having its axis of rotation lying substantially in said plane of symmetry, power means for turning the rotor predeterminedly in one direction, fore and aft water rudders on the body respectively in front and rear of said axis of rotation so constructed and arranged that when oppositely operated the lateral forces produced are substantially in balance whereby the torque of starting the rotor is opposed without substantial lateral displacement of the craft.

4. In rotary wing aircraft, a body having a longitudinal plane of symmetry, propeller means, water contact supporting means operatively mounted on the body symmetrically of the plane of symmetry, a rotary wing system operatively associated with the body and having its axis of rotation lying substantially in said plane of symmetry, power means for turning the rotor predeterminedly in one direction, fore and aft rudders disposed on the body respectively in front and rear of said axis of rotation asymmetrical relative to the plane of symmetry and so constructed and arranged that when oppositely operated during forward motion of the aircraft the lateral forces produced constitute substantially a lateral couple and the longitudinal forces produced add up and cooperate with the propeller thrust to form a longitudinal couple, whereby said couples overcome the reaction of the driven rotor.

5. In rotary wing aircraft, a body having a longitudinal plane of symmetry, propeller means, water contact supporting means operatively mounted on the body symmetrically of the plane of symmetry, a rotary wing system operatively associated with the body and having its axis of rotation lying substantially in said plane of symmetry, power means for turning the rotor predeterminedly in one direction, fore and aft water rudders on the body respectively in front and rear of said axis of rotation so constructed and arranged that when oppositely operated during forward motion of the aircraft the lateral forces produced constitute substantially a lateral couple whereby the torque of starting the rotor is opposed without substantial lateral displacement of the craft, and a single water drag producing element disposed on the laterally extreme portion of the supporting means to produce a drag which supplementally opposes the torque of starting the rotor.

EDWARD BURKE WILFORD.